United States Patent [19]
Allen

[11] Patent Number: 5,489,080
[45] Date of Patent: Feb. 6, 1996

[54] ADJUSTABLE EXTENDER FOR A VEHICLE EXTERIOR SIDE MIRROR

[76] Inventor: David W. Allen, 1041 Gina Way, Oakdale, Calif. 95361

[21] Appl. No.: 257,178

[22] Filed: Jun. 9, 1994

[51] Int. Cl.⁶ ........................................................ A47G 1/24
[52] U.S. Cl. .................... 248/480; 248/475.1; 359/874; 359/876
[58] Field of Search .................. 248/466, 475.1, 248/476, 479, 480, 486; 359/874, 876

[56] References Cited

U.S. PATENT DOCUMENTS

| | | | |
|---|---|---|---|
| 2,573,443 | 10/1951 | Holland | 248/480 |
| 2,596,632 | 5/1952 | Whitehead | 248/480 X |
| 3,166,197 | 1/1965 | Caylor et al. | 248/475.1 X |
| 3,297,063 | 1/1967 | McGuire | 403/263 X |
| 4,793,582 | 12/1988 | Bronstein et al. | 248/486 |
| 4,815,836 | 3/1989 | Byers et al. | 248/475.1 |
| 4,846,600 | 7/1989 | Strand | 403/263 X |
| 4,905,954 | 3/1990 | Taylor | 248/475.1 |
| 4,991,814 | 2/1991 | Schmidt et al. | 248/479 |
| 5,039,055 | 8/1991 | Lempelius | 248/480 |
| 5,292,100 | 3/1994 | Byers et al. | 248/480 |

*Primary Examiner*—Alvin C. Chin-Shue
*Assistant Examiner*—Derek J. Berger

[57] ABSTRACT

Disclosed is a new adjustable extender for a vehicle exterior side mirrors, for telescopingly extending an original equipment vehicle side rear view mirror, of a type commonly used on pickup trucks, away from a vehicle to increase an operator's field of view when towing a trailer. The extender comprises a generally horizontal tubular arm adapted to telescopingly receive a mounting arm of the original equipment mirror. A collar, threadedly engaged with the distal end of the arm, has a pair of opposing setscrews for securing the original equipment mirror mounting arm for holding the mirror at a preferred orientation relative the vehicle. The upper end of an adapting rod extends through a lateral hole near the proximal end of the arm such that the adapting rod depends normal the arm. The adapting rod is engagable with a vehicle side mirror original equipment mounting bracket in the same fashion as the original equipment mirror mounting arm. A screw pivotally adjustably secures the arm to the upper end of the adapting rod.

5 Claims, 4 Drawing Sheets

ADJUSTABLE EXTENDER FOR A VEHICLE EXTERIOR SIDE MIRROR

BACKGROUND OF THE INVENTION

1. Field of the Invention

The present invention relates to mounting devices for vehicle rear view mirrors and more particularly pertains to an adjustable extender for a vehicle exterior side mirror which may be adapted for telescopingly extending an original equipment vehicle side rear view mirror, of a type commonly used on pickup trucks, away from a vehicle to increase an operator's field of view when towing a trailer.

2. Description of the Prior Art

The use of mounting devices for vehicle rear view mirrors is known in the prior art. More specifically, mounting devices for vehicle rear view mirrors heretofore devised and utilized for the purpose of securing a vehicle rear view mirror in a position to enable the vehicle operator to see objects behind the vehicle without turning are known to consist basically of familiar, expected and obvious structural configurations, notwithstanding the myriad of designs encompassed by the crowded prior art which have been developed for the fulfillment of countless objectives and requirements.

The present invention is directed to improving devices for securing a vehicle rear view mirror in a position to enable the vehicle operator to see objects behind the vehicle without turning in a manner which is safe, secure, economical and aesthetically pleasing.

U.S. Pat. No. 5,217,197 to Spitzer describes a vehicle rear view mirror extension device comprising a U-shaped extension arm inserted in the original mirror mounting bracket on the vehicle and the original mirror support arm is inserted in a sleeve that is rigidly secured to the other end of the arm. U.S. Pat. No. 4,905,954 to Taylor discloses n vehicle exterior side mirror mount extension that is interposed between a vehicle side door mirror mounting and a mirror mount base.

The prior art also discloses a vehicle extendable side view mirror as shown in U.S. Pat. No. Des. 331,216 to McGouldrick, a mounting apparatus for outside rear view mirror assembly of U.S. Pat. No. 4,441,681 to Oda et al., and a bracket assembly in U.S. Pat. 3,473,773 to Meyer.

While these devices fulfill their respective, particular objectives and requirements, the aforementioned patents do not disclose an adjustable extender for a vehicle exterior side mirror for telescopingly extending an original equipment vehicle side rear view mirror, of a type commonly used on pickup trucks, away from a vehicle to increase an operator's field of view when towing a trailer.

In this respect, the adjustable extender for a vehicle exterior side mirror according to the present invention substantially departs from the conventional concepts and designs of the prior art, and in so doing provides an apparatus primarily developed for the purpose of telescopingly extending an original equipment vehicle side rear view mirror away from a vehicle to increase an operator's field of view when towing a trailer.

Therefore, it can be appreciated that there exists a continuing need for a new adjustable extender for a vehicle exterior side mirror which can be used for telescopingly extending an original equipment vehicle side rear view mirror, of a type commonly used on pickup trucks, away from a vehicle to increase an operator's field of view when towing a trailer. In this regard, the present invention, substantially fulfills this need.

As illustrated by the background art, efforts are continuously being made in an attempt to develop devices for securing a vehicle rear view mirror in a position to enable the vehicle operator to see objects behind the vehicle without turning. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of mounting devices for vehicle rear view mirrors now present in the prior art, the present invention provides a new mounting device for vehicle rear view mirrors wherein the same can be utilized for telescopingly extending an original equipment vehicle side rear view mirror, of a type commonly used on pickup trucks, away from a vehicle to increase an operator's field of view when towing a trailer. As such, the general purpose of the present invention, which will be described subsequently in greater detail, is to provide a new adjustable extender for a vehicle exterior side mirror apparatus and method which has all the advantages of the prior art mounting devices for vehicle rear view mirrors and none of the disadvantages.

The invention is defined by the appended claims with the specific embodiment shown in the attached drawings. For the purpose of summarizing the invention, the invention may be incorporated into a new adjustable extender for a vehicle exterior side mirror for telescopingly extending an original equipment vehicle side rear view mirror away from a vehicle to increase an operator's field of view when towing a trailer. The adjustable extender for a vehicle exterior side mirror comprises a generally horizontal tubular extension arm formed of stainless steel and adapted to telescopingly receive a mounting arm of the original equipment vehicle side view mirror. The extension arm has external threads formed on it's distal end, a first lateral hole through a bottom sidewall near it's proximal end, and a second lateral hole through a top sidewall opposing the first lateral hole. The second lateral hole is relatively smaller than the first lateral hole.

A connecting collar formed of stainless steel has internal threads formed on a proximal end of an axial bore therethrough. The proximal end of the connecting collar is threadedly engaged with the threads of the distal end of the extension arm. The connecting collar further has a pair of setscrews disposed within opposing lateral threaded bores intermediate the internal threads and a distal end. Tightening the setscrews secures the original equipment side view mirror mounting arm to hold the mirror at a preferred orientation relative the vehicle.

An adapting rod formed of stainless steel has an axial threaded bore formed in it's upper end. The upper end of the adapting rod extends through the first lateral hole of the extension arm such that the adapting rod depends normal the extension arm. The adapting rod is engagable with a vehicle side mirror original equipment mounting bracket in the same fashion as the original equipment mirror mounting arm.

A screw extends through the second lateral hole of the extension arm and is threadedly engaged with the axial bore of the adapting rod whereby pivotally adjustably securing the extension arm to the upper end of the adapting rod.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new adjustable extender for a vehicle exterior side mirror for telescopingly extending an original equipment vehicle side rear view mirror of a type commonly used on pickup trucks, away from a vehicle to increase an operator's field of view when towing a trailer.

It is another object of the present invention to provide a new adjustable extender for a vehicle exterior side mirror which may be easily and efficiently manufactured and marketed.

It is a further object of the present invention to provide a new adjustable extender for a vehicle exterior side mirror which is of a durable and reliable construction.

An even further object of the present invention is to provide a new adjustable extender for a vehicle exterior side mirror which is susceptible of a low cost of manufacture with regard to both materials and labor, and which accordingly is then susceptible of low prices of sale to the consuming public, thereby making such adjustable extenders for a vehicle exterior side mirror economically available to the buying public.

Still yet another object of the present invention is to provide a new adjustable extender for a vehicle exterior side mirror which provides in the apparatuses and methods of the prior art some of the advantages thereof, while simultaneously overcoming some of the disadvantages normally associated therewith.

Still yet another object of the present invention is to provide a new adjustable extender for a vehicle exterior side mirror that may be quickly and easily adjusted from inside the vehicle.

Yet another object of the present invention is to provide a new adjustable extender for a vehicle exterior side mirror that is adapted to extend a variety of original equipment mirrors without requiring mortification to the mirror, the mirror mounting bracket, or the extender.

Even still another object of the present invention is to provide a new adjustable extender for a vehicle exterior side mirror that may be easily installed with a minimum of hand tools.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
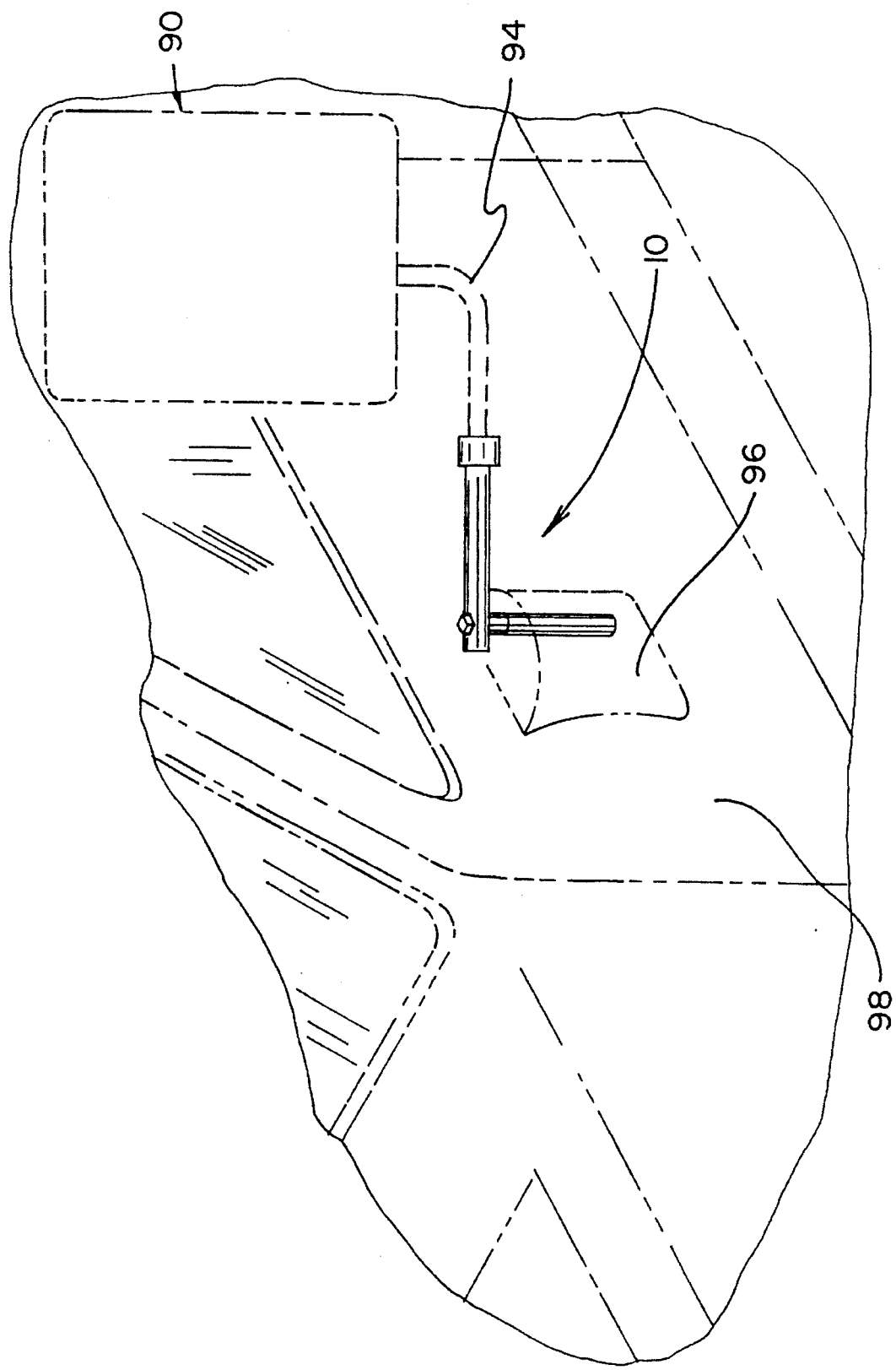
FIG. 1 is a top perspective view of the preferred embodiment of the new adjustable extender for a vehicle exterior side mirror showing its manner of use.
Figure 2:
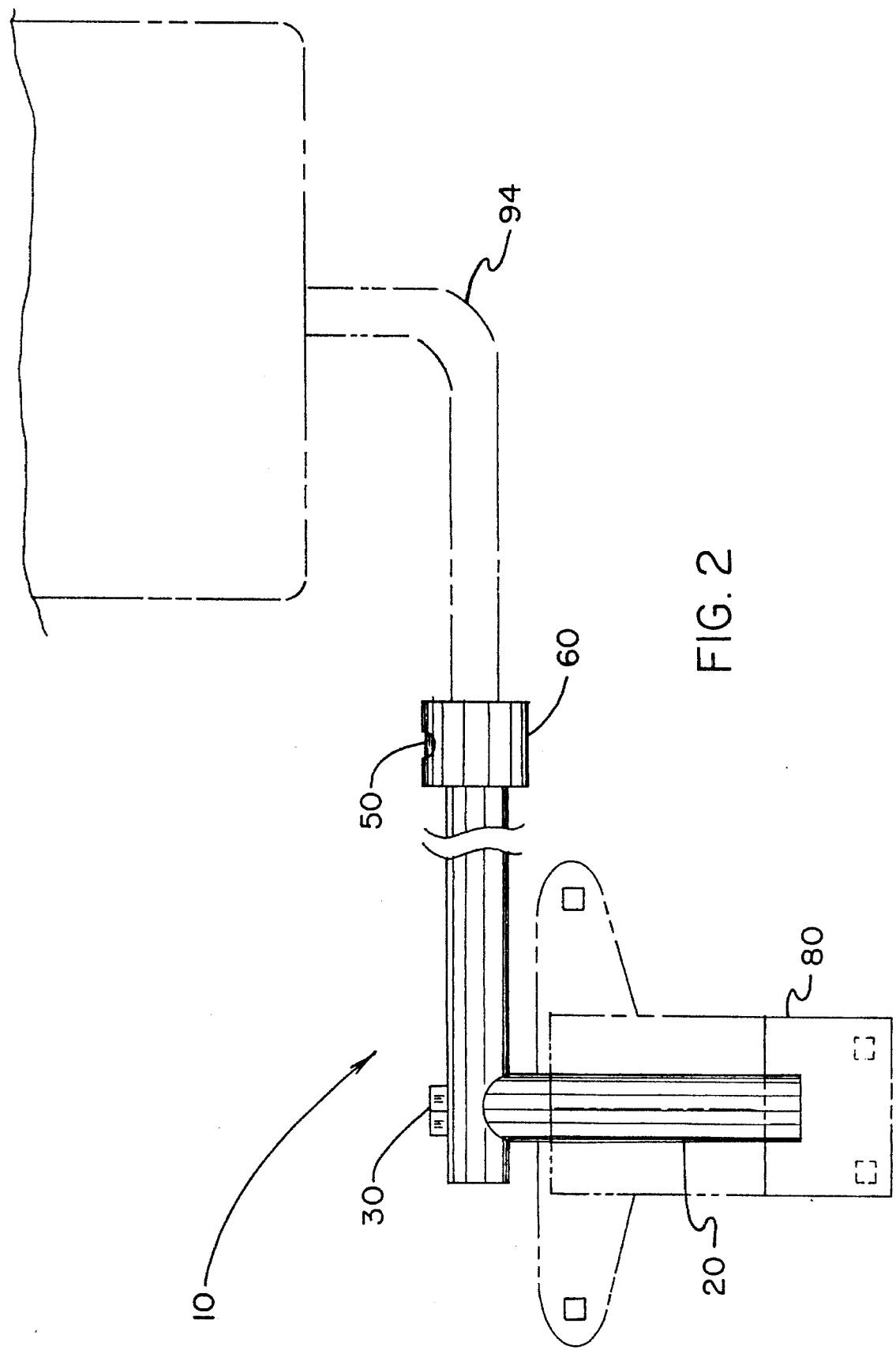
FIG. 2 is a side elevational view of the invention of FIG. 1 showing its manner of installation.
Figure 3:
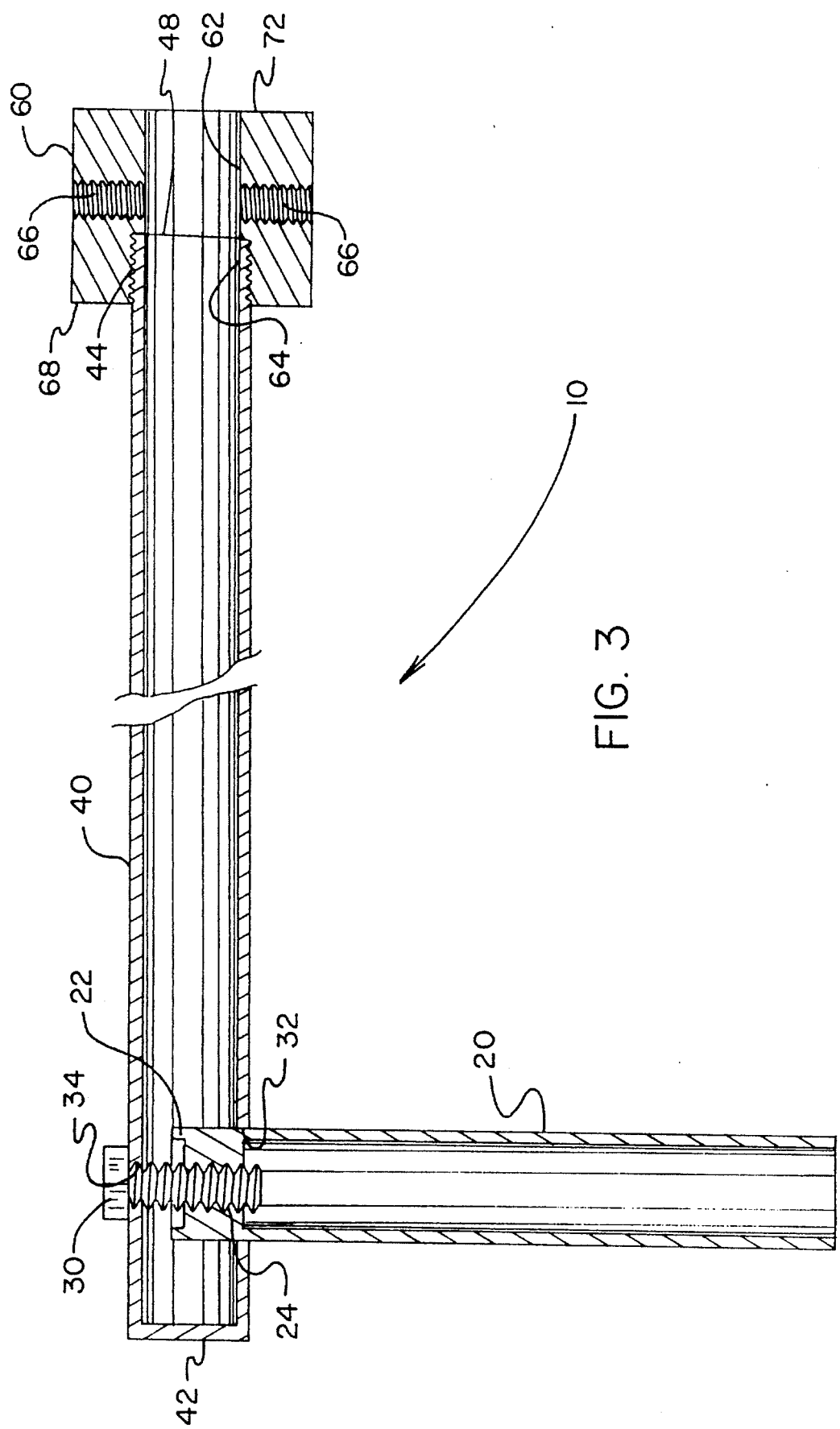
FIG. 3 is a sectional view of the invention of FIG. 1 taken along a line through the major plane.
Figure 4:
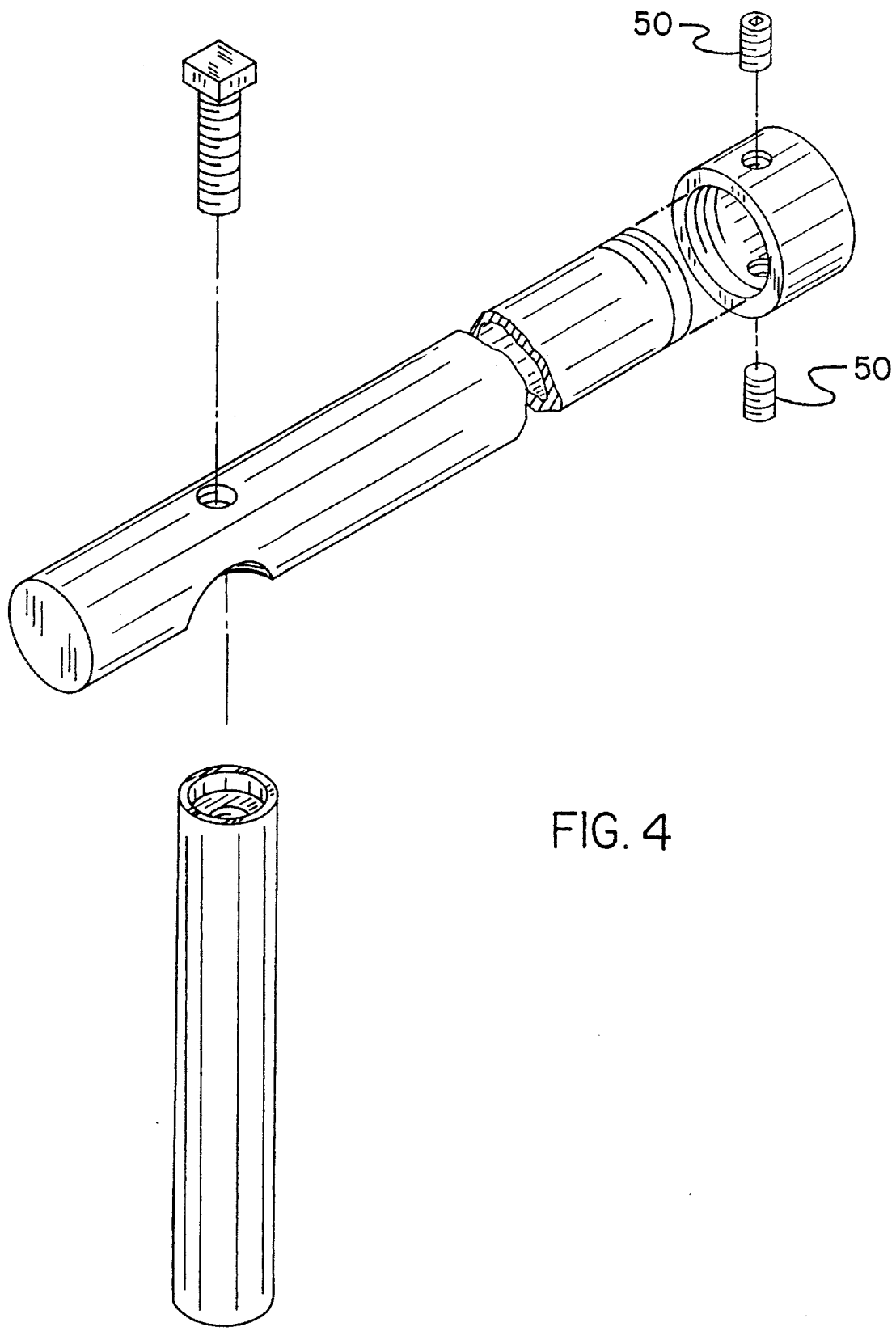
FIG. 4 is an exploded perspective view of the invention of FIG. 1.

With reference now to the drawings, and in particular to FIG. 1 thereof, a new adjustable extender for a vehicle exterior side mirror embodying the principles and concepts of the present invention and generally designated by the reference numeral 10 will be described.

From an overview standpoint, the adjustable extender for a vehicle exterior side mirror is adapted for use for telescopingly extending an original equipment vehicle side rear view mirror, of a type commonly used on pickup trucks, away from a vehicle to increase an operator's field of view when towing a trailer. See FIG. 1.

With reference now to FIGS. 1–4 and more specifically, it will be noted that a new adjustable extender for a vehicle exterior side mirror 10 is shown.

The adjustable extender for a vehicle exterior side mirror 10 comprises a generally horizontal tubular extension arm 40 formed of stainless steel and adapted to telescopingly receive a mounting arm 94 of the original equipment vehicle side view mirror 90. The extension arm 40 is formed of ⅞-inch diameter 17 gauge tubing and has an overall length of 7-inches. The extension arm 40 has external threads 44 formed on it's distal end 48, a first lateral hole 32 through a bottom sidewall, and a second lateral hole 34 through a top sidewall opposing the first lateral hole 32. The proximal end 42 of the extension arm 40 is sealed to prevent wind noise and entry of foreign objects. The center of the first hole 32 is located ⅝-inch from the proximal end 42 of the extension arm. The second lateral hole 34 is relatively smaller than the first lateral hole 34.

A connecting collar 60 formed of stainless steel has internal threads 64 formed on a proximal end of an axial bore 62 therethrough. The proximal end 68 of the connecting collar 60 is threadedly engaged with the threads of the distal end 48 of the extension arm 40. The connecting collar 60 further has a pair of setscrews 50 disposed within opposing lateral threaded bores 66 intermediate the internal threads 64 and the distal end 72 of the collar 60. Tightening the setscrews 50 secures the original equipment side view mirror mounting arm 94 to hold the mirror 90 at a preferred orientation relative the vehicle 98.

An adapting rod 20 formed of stainless steel has an axial threaded bore 24 formed in it's upper end 22. The adapting rod 20 has an external diameter of ¾-inches and an overall length of 4-inches. The upper end 22 of the adapting rod extends through the first lateral hole 32 of the extension arm such that the adapting rod 20 depends normal the extension arm 40. The adapting rod 20 is engagable with a vehicle side mirror original equipment mounting bracket 80 in the same fashion as the original equipment mirror mounting arm 94.

A square head cap screw 30 extends through the second lateral hole 34 of the extension arm 40 and is threadedly engaged with the axial bore 24 of the adapting rod 20 whereby pivotally adjustably securing the extension arm 40 to the upper end 22 of the adapting rod 20.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A new adjustable extender for a vehicle exterior side mirror for telescopingly extending an original equipment vehicle side rear view mirror, of a type commonly used on pickup trucks, away from a vehicle to increase an operator's field of view when towing a trailer, the adjustable extender for a vehicle exterior side mirror comprising:

a generally horizontal tubular extension arm formed of stainless steel and adapted to telescopingly receive a mounting arm of the original equipment vehicle side view mirror such that the mirror is in an orientation orthogonal to an original orientation, the extension arm having external threads formed on a distal end thereof, a first lateral hole through a bottom sidewall near a proximal end thereof, and a second lateral hole through a top sidewall opposing the first lateral hole, the second lateral hole being relatively smaller than the first lateral hole;

a connecting collar formed of stainless steel and having internal threads formed on a proximal end of an axial bore therethrough, the proximal end of the connecting collar being threadedly engaged with the threads of the distal end of the extension arm, the connecting collar further having a pair of setscrews disposed within opposing lateral threaded bores intermediate the internal threads and a distal end thereof for securing an original equipment side view mirror mounting arm to hold the mirror at a preferred orientation relative the vehicle;

an adapting rod formed of stainless steel and having an axial threaded bore formed in an upper end thereof, the upper end of the adapting rod extending through the first lateral hole of the extension arm such that the adapting rod depends normal the extension arm, the adapting rod being engagable with a vehicle side mirror original equipment mounting bracket in the same fashion as the original equipment mirror mounting arm; and a screw extending through the second lateral hole of the extension arm, the screw also being threadedly engaged with the axial bore of the adapting rod whereby pivotally adjustably securing the extension arm to the upper end of the adapting rod.

2. The adjustable extender for a vehicle exterior side mirror of claim 1 wherein the extension arm is formed of ⅞-inch diameter 17 gauge tubing having an overall length of 7-inches.

3. The adjustable extender for a vehicle exterior side mirror of claim 2 wherein the adapting rod has an external diameter of ¾-inches and an overall length of 4-inches.

4. The adjustable extender for a vehicle exterior side mirror of claim 3 wherein the center of the first hole of the extension arm is located ⅝-inch from the proximal end thereof.

5. The adjustable extender for a vehicle exterior side mirror of claim 4 wherein the extension arm, connecting collar, and adapting rod are formed of chrome plated black iron.

* * * * *